United States Patent [19]
Ehmann et al.

[11] Patent Number: 5,996,330
[45] Date of Patent: Dec. 7, 1999

[54] LINK FOR A CABLE DRAG CHAIR

[75] Inventors: Bruno Ehmann, Mögglingen; Rainer Funk, Wüstenrot, both of Germany

[73] Assignee: Murplastik System-Technik GmbH, Germany

[21] Appl. No.: 09/114,723

[22] Filed: Jul. 13, 1998

Related U.S. Application Data

[63] Continuation of application No. PCT/EP97/06201, Nov. 7, 1997.

[30] Foreign Application Priority Data

Nov. 14, 1996 [DE] Germany .......................... 196 47 080

[51] Int. Cl.$^6$ .................................................. F16G 13/16
[52] U.S. Cl. .............................. 59/78.1; 59/900; 248/49
[58] Field of Search ................... 59/78, 78.1; 248/48, 248/49, 50, 51

[56] References Cited

U.S. PATENT DOCUMENTS

| | | | |
|---|---|---|---|
| 4,807,432 | 2/1989 | Mauri | 59/78.1 |
| 4,813,224 | 3/1989 | Blase | 59/78.1 |
| 4,833,876 | 5/1989 | Kitao et al. | 59/78.1 |
| 4,962,639 | 10/1990 | Blase | 59/78.1 |
| 5,038,556 | 8/1991 | Moritz et al. | 59/78.1 |
| 5,184,454 | 2/1993 | Klein et al. | 59/78.1 |
| 5,201,885 | 4/1993 | Wehler et al. | 59/78.1 |

FOREIGN PATENT DOCUMENTS

| | | |
|---|---|---|
| 308958 | 3/1989 | European Pat. Off. . |
| 3408912 | 8/1985 | Germany . |
| 3516448 | 9/1986 | Germany . |
| 3531066 | 3/1987 | Germany . |
| 3812559 | 11/1989 | Germany . |
| 4015803 | 11/1991 | Germany . |
| 4225016 | 2/1993 | Germany . |

*Primary Examiner*—David Jones
*Attorney, Agent, or Firm*—Schweitzer Cornman Gross & Bondell LLP

[57] ABSTRACT

A link of a conduit chain, the link comprising two side plates adapted to be disposed in a substantially parallel relationship to each other and defining an interior space between them, and two crosspieces each for releasably connecting to each other corresponding ends of said the plates, the crosspieces further defining the interior space, each of the side plates and each of the crosspieces having respective free ends, a receptacle formed in the free end of each side plate for accommodating the free end of a crosspiece, engaging means adjacent to the free end of each side plate, and means adjacent to each free end in each crosspiece for engaging the crosspiece with the engaging means in a side plate.

10 Claims, 4 Drawing Sheets

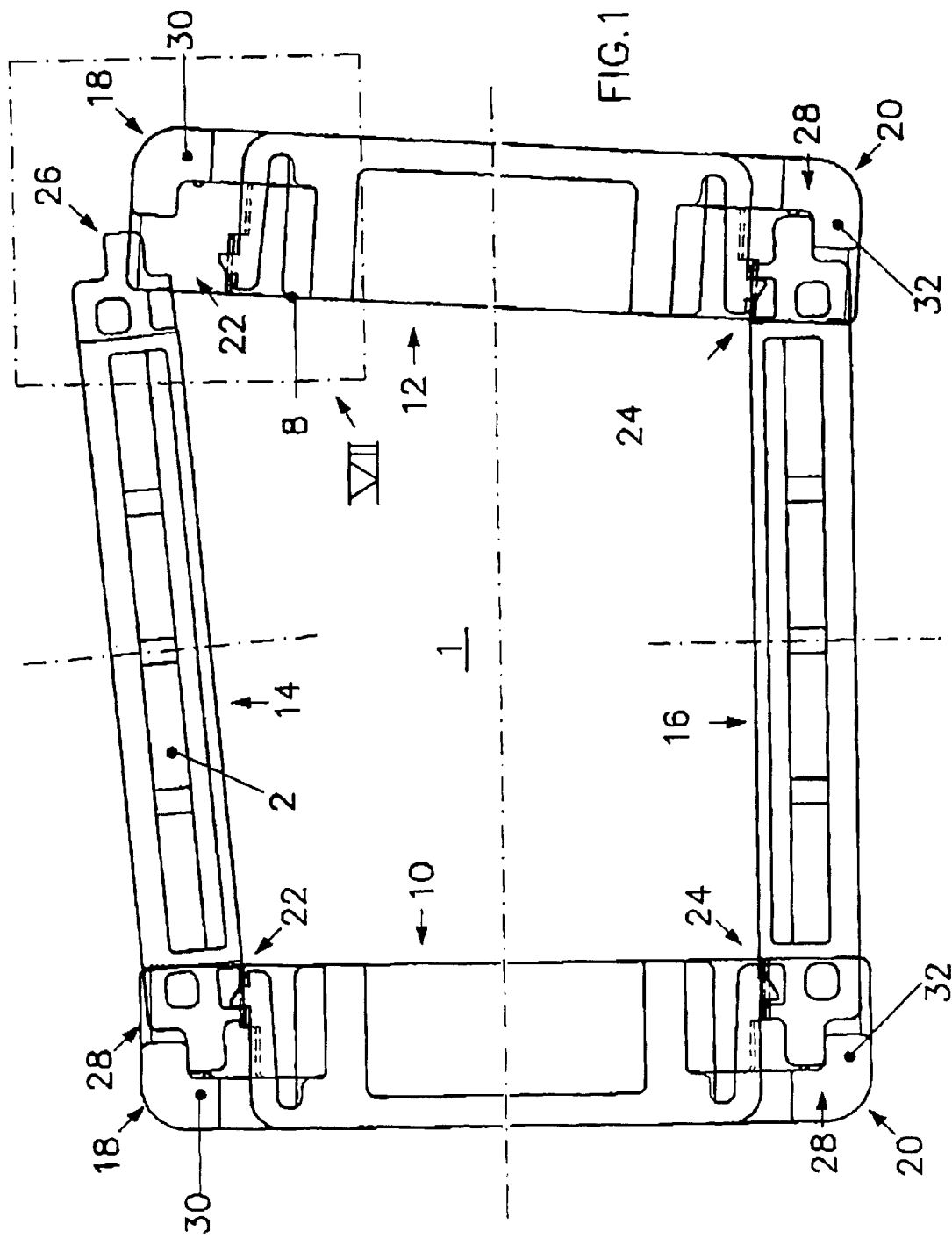

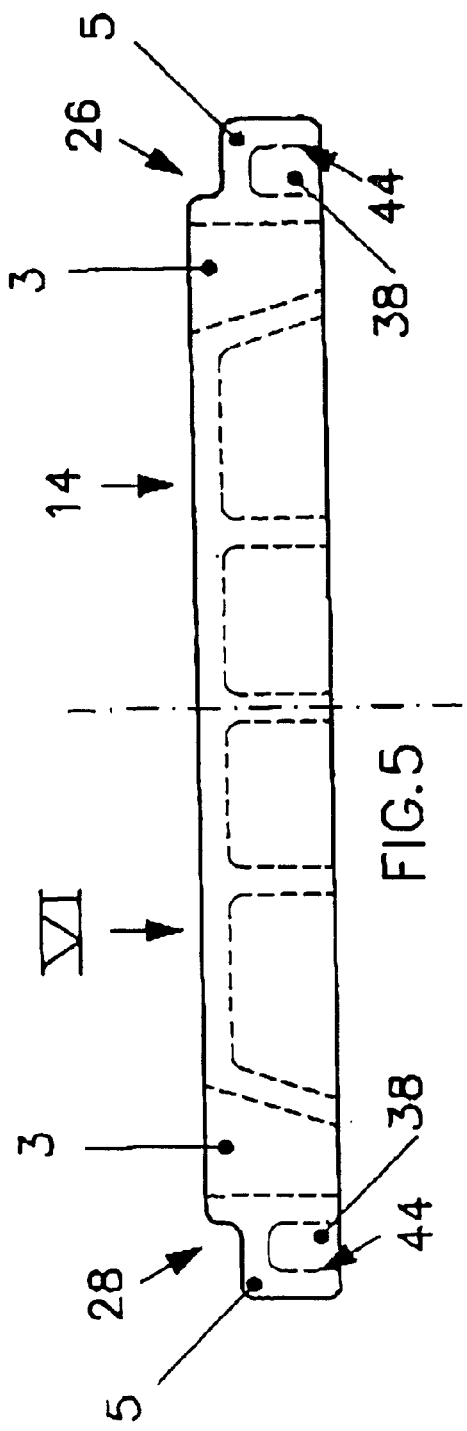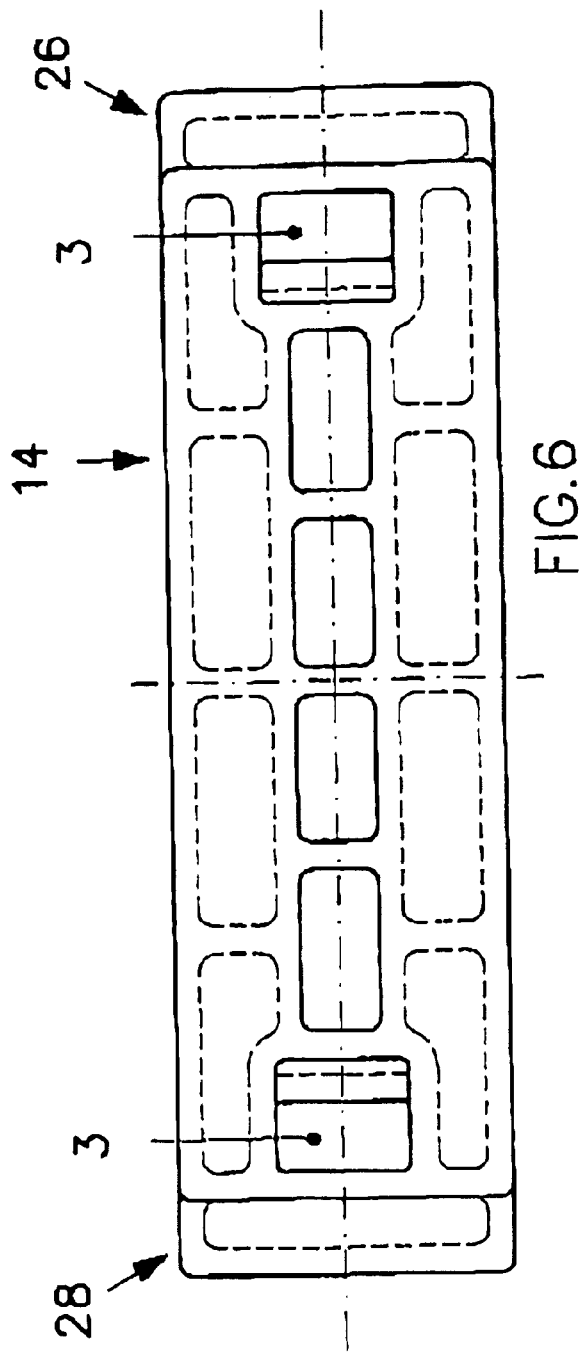

LINK FOR A CABLE DRAG CHAIR

This application is a continuation of international application No. PCI/EP97/06201, filed on Nov. 7, 1997.

FIELD OF THE INVENTION

The relates to an element or link for a conduit or cable drag, or guide chain, such as for containing cables, wires and hoses of all types.

BACKGROUND

In such conduit or cable drag, or guide chains of the prior art, as for example described in U.S. Pat. No. 4,807,432; and German patent publications, Nos. 4,225,016; 3,408,912; and 3,516,448, the crosspieces are provided that have at their free ends resilient engaging means which can be brought into receptacles in the side plates, and can be resiliently engaged therewith. These receptacles in the side plates are at least partly open at their top or bottom, so that the ends of the crosspieces can be thrust or pushed into the receptacles from above. The receptacles, open at the top or the bottom, do in fact simplify connection of the crosspiece to the side plates, but regularly lead to a situation in which upon placing a load on the crosspiece, the side plates can become damaged in the region of the cover-side of the receptacle and break or become released from the plates. A certain amount of relief can be provided against this by providing the side plates with a greater wall thickness in the receiving area, however this is not advantageous for injection molding. In addition, this measure involves a higher cost for materials.

There are further conduit chain links or elements disclosed in German patent publication No. 3,531,066 and in European patent No. 308,958 wherein the plates have projections aligned towards one another and into the interior space of the conduit chain, and which can be connected with corresponding recesses in the crosspieces. Finally, German patent publication No. 3,812,559 shows a conduit chain, the plates of which have bores into which rod-shaped webs can be thrust and are held in position by screws. This way a high degree of stability of the conduit chain link is achieved and any breaking-out of the plate receptacle is practically avoided. This is however achieved at the expense of additional construction cost and of further components, and this is undesirable.

SUMMARY OF THE INVENTION

The object of the is to provide a conduit link without disproportionate constructive outlay so that a simple functional connection can be made between the crosspieces to the side plates without damage to the side plates.

Accordingly, the present invention is an element or link of a conduit chain, the element comprising two side plates adapted to be disposed in a substantially parallel relationship to each other and defining an interior space between them, and two crosspieces each for releasably connecting to each other corresponding ends of the side plates, the crosspieces further defining the interior space, each of the side plates and each of the crosspieces having respective free ends, a receptacle formed in the free end of each side plate for accommodating the free end of a crosspiece, resilient engaging means adjacent to the free end of each side plate, and means adjacent to each free end in each crosspiece for engaging the crosspiece with the resilient engaging means in a side plate. Thus the principal structural difference of the chain link structure of the present invention is that the ends of the crosspieces can be inserted into a receptacle in the side of the ends of the side plates, rather than be inserted into the side plates from the top or the bottom.

The invention makes use of the fact that the side plates and crosspieces, which are customarily of plastics, but which can also be of metal, have manufacturing tolerances and/or a certain degree of elasticity, which is utilized to produce an operative connection between the side plates and the crosspieces. The connection between two side plates and the first crosspiece can also be simply made, especially as the three parts can be conventionally connected together. The last part, i.e. the upper crosspiece, is first connected as normally with one side plate. Thereupon the other side plate which is already connected to the lower crosspiece, is pivoted or bent outwardly laterally by a few millimeters, so that the free end of the upper crosspiece can be guided along the inner wall of this side plate, until it is located in the region of the associated receptacle or of the projection in the side plate. In this position the outwardly-bent or pivoted side plate is pressed in the opposite direction or is released, i.e. the side plate is relaxed and no further external forces act upon it, so that it extends roughly parallel to the other side plate and connects the free end of the crosspiece to the connecting means.

It is particularly advantageous to select the connecting means in the manner of a receptacle/projection, the insertion direction of these parts suitably extending parallel to the extension of the crosspiece. When a receptacle is used as a connecting means, the length of the crosspiece is greater than the clearance between the relaxed plates. If however projections are selected as connecting means, then the length of the crosspiece is greater than the distance apart of the projections. The measures proposed are independent of the size of the conduit element or link.

A particularly advantageous feature of the invention provides that the end of the crosspiece is supported over its entire width on the wall portion. Thus the crosspiece end can be connected in a positive manner with the receptacle at least in the region of the wall portion. The positive-locking connection ensures that the linked parts behave as if they were a single piece. Thus also the play between the individual conduit elements or links is minimized.

In a further advantageous feature of the invention, the crosspiece can be connected to the plate by means of resilient engaging members. This measure ensures that even in the case of extreme inner stresses on the side plates no involuntary loosening occurs between the connections established between the side plates and the crosspieces. In a suitable embodiment of the invention the resiliently engaging members are resilient projections and receptacles, and thus fix or prevent the movements of the crosspiece in its longitudinal direction. Thus the resilient projections can be elastically deformed and transversely pivoted to the crosspieces. To optimize the connection between the resilient projections and receptacles in a suitable feature of the invention the resiliently engaging projection has a section extending parallel to the crosspiece, and it carries a nose extending approximately vertically to the crosspiece, and this engages in a corresponding recess in the crosspiece and is supported therein in the tension direction of the crosspiece. The crosspieces are regularly stressed by the cables or hoses in the conduit, and due to their weight attempt to press the crosspieces outwardly. As the ends of the crosspieces are located in the receptacles which are suitably closed on the circumferential side, tension forces are exerted in this area in particular on the ends, these forces being optimally absorbed by the proposed resiliently engaging projections and recesses. Furthermore, the recesses have an inner wall extending approximately vertically to the longitudinal axis of the crosspiece, and which can be brought into a pressure connection with a surface of the nose which is parallel therewith.

To be able to release the crosspiece from the plate, a suitable feature of the provides that an opening, terminating in the recess, for actuating the resilient projection, is formed in the end of the crosspiece.

BRIEF DESCRIPTION OF THE DRAWING

The is further disclosed with reference being held to the drawing, wherein:

FIG. 1 shows a chain link,

FIG. 5 shows a side view of a crosspiece, FIG. 6 shows the crosspiece of FIG. 5 from the direction of the arrow VI.

DETAILED DESCRIPTION

The conduit element or link shown in FIGS. 1 to 4 is provided for energy supply and other conduits for receiving hoses, cables or the like. Such conduit is provided for passing all types of energy and materials through pipes or cables such as from a fixed connection to a movable consumer. In this case the pipes, wires or cables are located in continuous inner spaces 1 of a respective link or element of a conduit. The link generally has two side plates (chain plates).

Figure 7:
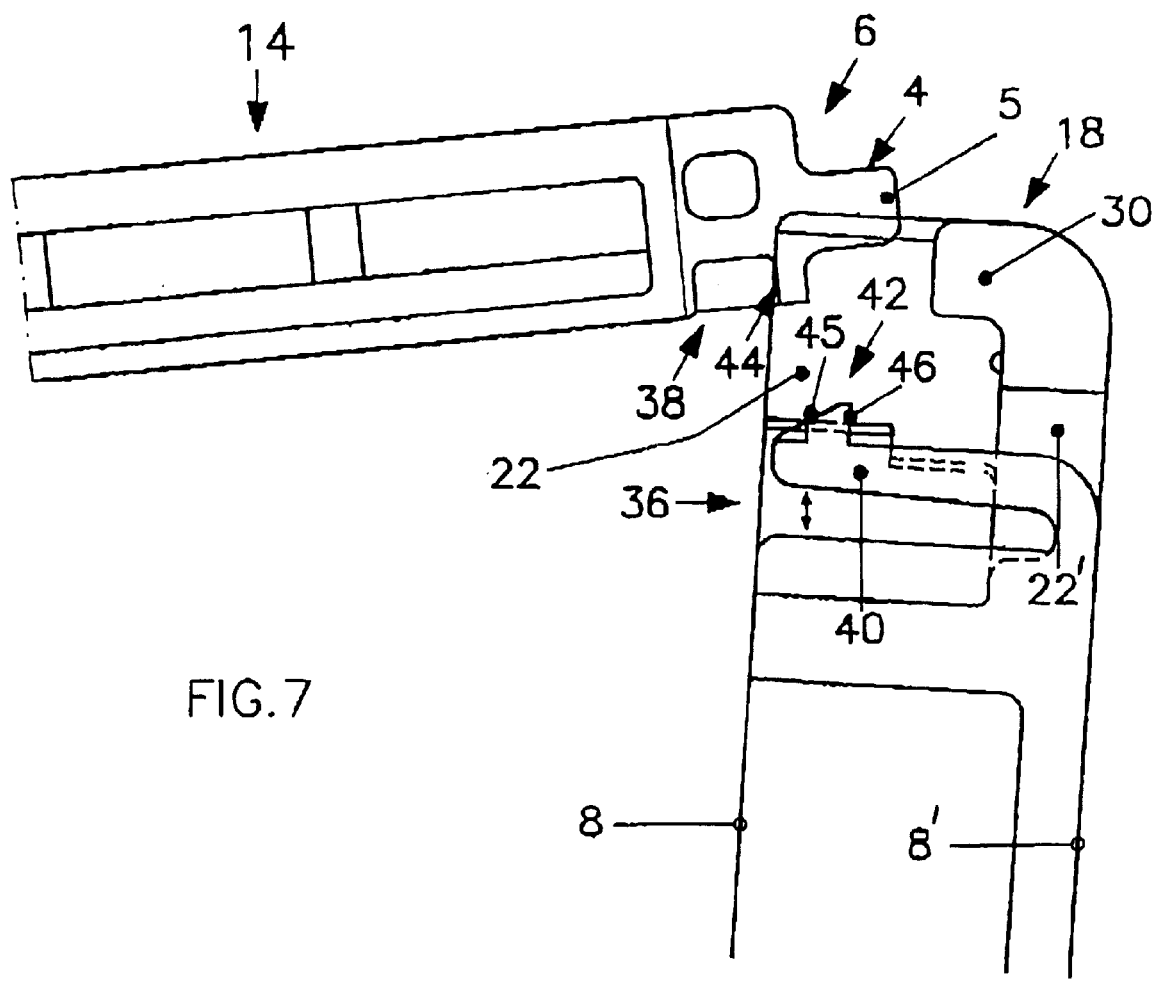
FIG. 7 shows as enlarged portion demarcated in FIG. 1 by the line VII.

In the present embodiment the link or conduit element has two side plates 10, 12 extending parallel to one another and can be connected together by means of crosspieces 14, 16. The side plates 10, 12 have cover and base sides 18, 20 extending parallel to the crosspieces and receptacles 22, 24 for the free ends 26, 28 of the crosspieces 14, 16, these receptacles 22, 24 being formed in the inner walls 8 of the side plates 10, 12. The side plates 10, 12 and the crosspieces 14, 16 define the inner space 1 of the chain link. The wall portions 30, 32 of the receptacles 22, 24 in the cover or base side 18, 20 of the plate 10 or 12 extend over the width of the corresponding crosspiece ends 26, 28. These ends 26, 28 each are supported over its entire length on the wall portions 30, 32. It can be seen that the end 26, 28 can be connected at least in the region of the wall portion 30 or 32 to the receptacle 22 or 24. Thus the width of the receptacle 22 approximately corresponds to the width of the end 26. This ensures that a strong connection is produced between the ends and the receptacles. Thus in particular FIGS. 1 and 7 show that the crosspieces 14, 16 can be connected to the side plates 10, 12 by resiliently engaging members which are resiliently engaging projections 36 (FIG. 7) and thus receptacles 38, and the crosspieces 14,16 in their longitudinal direction against movement. The resilient projections 36 are elastically deformable and transversely pivotable respectively toward the crosspieces 14, 16. Thus the resilient projection 36 has a resilient section 40 extending parallel to the crosspieces 14, 16, and which suitably integrally is provided with a projecting nose 42 which in side view has a triangular shape extending substantially vertically toward the crosspiece 14 or 16, as the case may be. A vertical side 46 of the nose 42 engages a corresponding receptacle or recess 38 of the crosspiece 14 or 16 and is supported therein in the tension direction of the crosspiece 14 or 16. This receptacle 38 has an inner wall 44 extending approximately perpendicularly to the longitudinal axis 2 of the crosspiece 14 or 16, and which can be engaged by a pressure connection with a vertical surface 46 of the nose 42. FIG. 7 clearly shows that the recess 38 is firmly positioned within the receptacle 22, and that the free end 26 of the corsspiece 14 has a taper 6 with a support wall 4.

FIGS. 5 and 6 show that an opening 3 terminating in the receptacle 38 is formed for operating the resilient projection 36.

FIGS. 1–4 also show that the side plates 10 and 12 and crosspieces 14 and 16 respectively have the same shape. In the case of the illustrated embodiment of the present these are suitably plastic parts which can be connected together in a modular fashion. These parts can generally also be of a metal.

The lower crosspiece 16 can also generally be integrally formed with the two side plates, and be convexly flexible in the direction of the inner space 1, so that only the upper crosspiece 8 would require to be connected to the two side plates 10 and 12.

Figure 4:
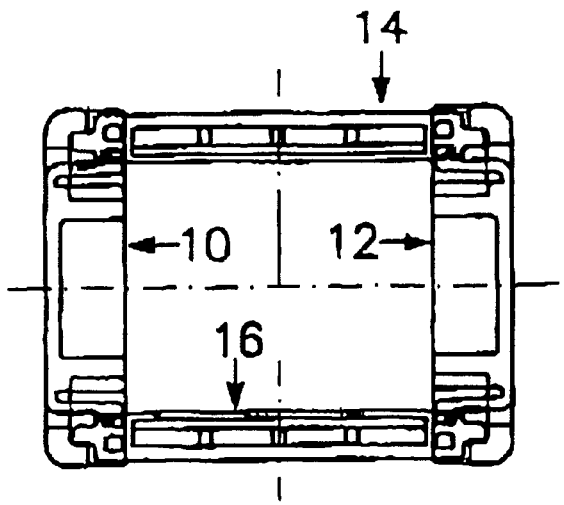
FIGS. 2 to 4 show the establishment of a connection between a crosspiece and a side plate.
Figure 3:
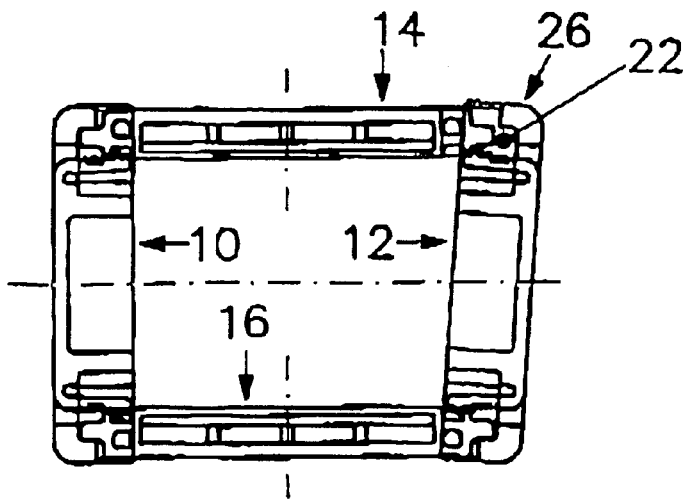
Figure 2:
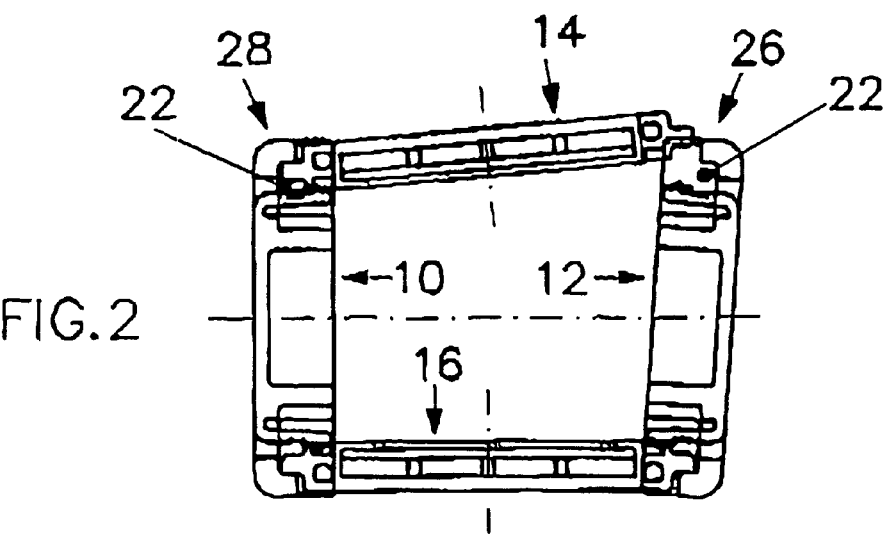

FIGS. 2–4 show how the crosspiece 14 can be connected to the chain link. The lower crosspiece 16 can be conventionally connected without any difficulty to the side plates 10 and 12. Thereupon the left free end 26 in FIG. 2 is thrust into the receptacle 22. The right side plate 22 is bent or pivoted to the right, and the right free end 26 of the crosspiece 14 is moved into the receptacle 22 from the top downwardly as shown in FIG. 3. Once the free end 26 assumed the desired position, the side plate 12 is pivoted or pressed back into its original relaxed position due to its inherent elasticity, as shown in FIG. 4. Thus the nose 42 engages in the receptacle 8 and is resiliently locked at this point, the projecting surface 46 being supported on the inner wall 44. As shown in FIG. 7, the free end 26 of other crosspiece 14 has a tapering step 6, which tapers into a support surface 4 parallel to the axis 2, and the free end can be brought into pressure contact with the surface 30. The resiliently engaging projection 36, which is fully housed in the receptacle 22, has a section 40 the free end of which carries a nose 42. The receptacle is in the inner wall 8 advantageously for injection molding preparation.

Finally, FIGS. 5 and 6 show that the crosspiece 14 has recesses, indentations or openings 3 which are so positioned that they facilitate access to the resiliently engaging nose 42. If the crosspiece 14 is to be released from the side plates, then the resilient engaging nose 42 can be actuated for example by depressing the nose with a screwdriver pushed through the continuous opening 3. Thus suitably a obliquely tapering surface 45 of the nose 42 is pressed downwardly, and the nose 42 separates from the recess 38 and the end of the crosspiece if freed for removal from the receptacle 22.

The proposed measures are substantially independent of the shape, size and weight of the chain links, and can therefore practically always be realized. The pivoting or bending outwardly of the site plates and/or crosspieces so that the free end of the crosspiece to be connected passes into the inner space of the chain link, i.e. into the area of the connecting means, can be carried out without any additional tools. The desired flexibility of at least one crosspiece can be achieved for example so that the crosspiece, in the region of its inner wall facing the interior of the chain link has a notch, so that the crosspiece can be bent inwardly, but not outwardly. Thus it is of particular importance for the present that at least one plate and/or one crosspiece is so designed and is of such dimensions, that by it the free end of the crosspiece can be positioned at the predetermined position.

We claim:

1. A link of a cable drag chain, the link comprising two side plates each having a thickness and being adapted to be disposed substantially parallel to each other and defining an interior space between them, each of said side plates having opposed edges, and two elongated crosspieces each having a longitudinal axis, and at least one of said crosspieces being provided for releasably connecting said side plates to each other, said crosspieces further defining said interior space, at least one of said crosspieces having respective free ends, a receptacle formed in at least one edge of each side plate and having a depth for accommodating therein the free end of a crosspiece, engaging means adjacent to said at least one edge of each of said side plates, and means adjacent to each free end in each crosspiece for engaging said crosspiece with said engaging means in a side plate, at least one of said crosspieces being elastically bendable or pivotable about its longitudinal axis, or at least one of said side plates being elastically bendable or pivotable across its thickness, or at least one of said crosspieces and at least one of said side plates being elastically bendable or pivotable respectively about said longitudinal axis and across said thickness for positioning a free end of said crosspiece in a corresponding receptacle of a side wall adjacent thereto.

2. The link of claim 1, wherein at least one of said crosspieces is elastically bendable or pivotable about its longitudinal axis, or at least one of said side plates is elastically bendable or pivotable across its thickness, or at least one of said crosspieces and at least one of said side plates is elastically bendable or pivotable respectively about said longitudinal axis and across said thickness for positioning a free end of said crosspiece in a corresponding receptacle of a side wall adjacent thereto.

3. The link of claim 2, wherein the receptacle in an edge of each side plate has a cover portion, and each free end in at least one of the crosspieces being adapted to fit within a receptacle in the edge of a side plate, and said cover portion of each of said receptacles is provided for retaining each free end of a crosspiece within a receptacle in the edge of a side plate.

4. The link of claim 1, wherein said engaging means each is a resilient engaging member, and said means in each of said crosspieces for engagement with said engaging means is a recess, each of said resilient engaging members releasably engaging a recess in each crosspiece.

5. The link of claim 4, wherein each of said resilient engaging means in each side plate comprises a projection urged resiliently outwardly toward an adjacent edge and into releasable engagement with a recess in a crosspiece.

6. The link of claim 5, wherein each of said side plates has a longitudinal axis, and wherein each resilient engaging means comprises an elongated extension with two ends and disposed substantially perpendicularly to said longitudinal axis, one end being resiliently mounted from said side plate, and said projection extending from adjacent to the other end of said extension.

7. The link of claim 5, further comprising an opening adjacent to the free end of each crosspiece through said crosspiece for providing exterior access from said crosspiece to said projection of a resilient engaging member located adjacent to said free end.

8. The link of claim 1, wherein each free end of each crosspiece has a width, and each of said free ends is an end portion that is narrower than the rest of said crosspiece between said end portions, and the length of each of said crosspiece end portions approximately corresponds to the depth of each of said receptacles.

9. The link of claim 8, wherein the width of each free end of a crosspiece approximately corresponds to the width of each of said receptacles.

10. The link of claim 1, wherein each free end of each crosspiece is a taperingly narrowing end portion.

* * * * *